(12) United States Patent
Montgomery et al.

(10) Patent No.: US 11,519,326 B2
(45) Date of Patent: Dec. 6, 2022

(54) ADJUSTABLE RING SHIM FOR TRACTION DRIVE

(71) Applicant: SuperTurbo Technologies, Inc., Loveland, CO (US)

(72) Inventors: Marc Montgomery, Loveland, CO (US); Jared Howe, Loveland, CO (US); Ryan Sherrill, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 0 days.

(21) Appl. No.: 17/675,738

(22) Filed: Feb. 18, 2022

(65) Prior Publication Data

US 2022/0307409 A1 Sep. 29, 2022

Related U.S. Application Data

(60) Provisional application No. 63/164,812, filed on Mar. 23, 2021, provisional application No. 63/214,630, filed on Jun. 24, 2021.

(51) Int. Cl.
| | |
|---|---|
| *F16H 13/08* | (2006.01) |
| *F02B 37/10* | (2006.01) |
| *F02B 39/04* | (2006.01) |
| *F16H 37/02* | (2006.01) |
| *F16H 13/14* | (2006.01) |

(52) U.S. Cl.
CPC ............ *F02B 37/105* (2013.01); *F02B 39/04* (2013.01); *F16H 13/08* (2013.01); *F16H 13/14* (2013.01); *F16H 37/02* (2013.01)

(58) Field of Classification Search
CPC ........ F02B 37/105; F02B 39/04; F16H 13/08; F16H 13/14; F16H 37/02
See application file for complete search history.

(56) References Cited

U.S. PATENT DOCUMENTS

| | | | | |
|---|---|---|---|---|
| 9,670,832 | B2* | 6/2017 | Sherrill | F16H 47/08 |
| 10,107,183 | B2* | 10/2018 | Sherrill | F02B 39/04 |
| 10,539,159 | B2* | 1/2020 | Howe | F04D 29/624 |
| 10,539,210 | B2* | 1/2020 | Montgomery | F02B 39/04 |
| 10,655,711 | B2* | 5/2020 | Montgomery | F16H 13/14 |
| 10,927,889 | B2* | 2/2021 | Waldron | F16C 19/507 |
| 11,143,234 | B2* | 10/2021 | Howe | F16C 19/54 |
| 2022/0307411 | A1* | 9/2022 | Montgomery | F02B 37/105 |

* cited by examiner

*Primary Examiner* — Derek D Knight
(74) *Attorney, Agent, or Firm* — William W. Cochran; Cochran Freund & Young LLC

(57) ABSTRACT

Disclosed is an adjustable ring shim for a planetary traction drive designed for a driven turbocharger on an engine. The adjustable ring shim has two parts that interface through a ramp feature to provide an ability to vary the overall width of the ring roller assembly of the planetary traction drive. This adjustability in the width of the ring roller allows for setting a desired preload force on the traction surfaces of the traction drive during assembly, even with variation in manufacturing of the different parts of the traction drive.

20 Claims, 7 Drawing Sheets

Fig 3

ADJUSTABLE RING SHIM FOR TRACTION DRIVE

CROSS-REFERENCE TO RELATED APPLICATIONS

This Non-Provisional patent application claims the benefit of the U.S. Provisional Patent Application No. 63/164,812, entitled "Adjustable Ring Shim for Traction Drive," which was filed with the U.S. Patent & Trademark Office on Mar. 23, 2021, and the U.S. Provisional Patent Application No. 63/214,630, entitled "Spring Preload for Traction Drive," filed on Jun. 24, 2021, all of which are specifically incorporated herein by reference for all that they disclose and teach.

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency. One class of driven turbocharger utilizes a planetary traction drive that interfaces with the turbo shaft to provide torque to and from the turbo shaft.

SUMMARY

An embodiment of the present invention may therefore comprise a planetary traction drive comprising: a sun shaft; a plurality of planet rollers with outer roller traction surfaces that interface with the sun shaft; a ring roller assembly comprising: a ring gear; a first traction ring and a second traction ring located concentrically with the ring gear that interface with slanted inner roller traction surfaces of the plurality of planet rollers; at least one adjustable ring shim between the ring gear and the first traction ring that sets a width of the ring roller assembly to provide a preload force on the slanted inner roller traction surfaces of the plurality of planet rollers during assembly of the traction drive, where the adjustable ring shim comprises: a ramp feature on said first traction ring that mates with a matching ramp feature on the ring gear such that when the first traction ring is rotated relative to the ring gear during assembly the ramp feature slides on the matching ramp feature and moves the first traction ring axially away from the ring gear to set the width of the ring roller assembly.

An embodiment of the present invention may therefore further comprise a method of setting a preload in a planetary traction drive comprising: interfacing outer roller traction surfaces of a plurality of planet rollers with a sun shaft; assembling a ring roller assembly comprising a ring gear, a first traction ring, and a second traction ring; interfacing said first traction ring and said second traction ring with slanted inner roller traction surfaces of the plurality of planet rollers; forming a ramp feature on the first traction ring that mates with a matching ramp feature on the ring gear to produce an adjustable ring shim; rotating the first traction ring relative to the ring gear to slide the ramp feature on the matching ramp feature which moves the first traction ring axially away from the ring gear and sets a width of the ring roller assembly to place a preload force on the slanted inner roller traction surfaces of the plurality of planet rollers during assembly of the planetary traction drive.

DETAILED DESCRIPTION OF THE EMBODIMENTS

Figure 1:
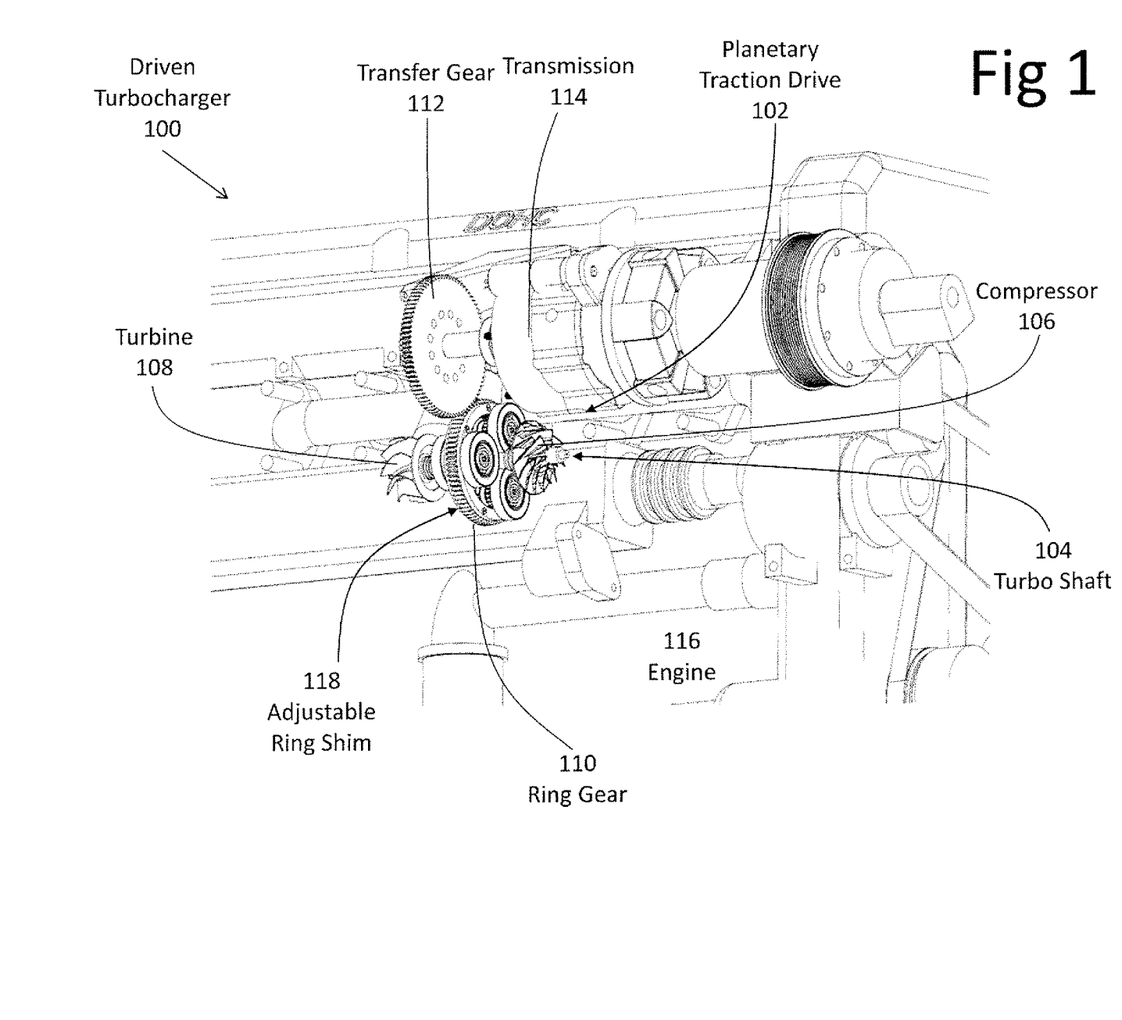
FIG. 1 is an isometric view of a driven turbocharger with a planetary traction drive coupled to an engine.

FIG. 1 is an isometric view of a driven turbocharger 100 with a driven turbocharger with a planetary traction drive 102 coupled to an engine 116. The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 9,670,832, issued Jun. 6, 2017, entitled "Thrust Absorbing Planetary Traction Drive SuperTurbo," and U.S. Pat. No. 10,655,711, issued May 19, 2020, entitled "Single Angular Contact Ball Ramp For Driven Turbocharger." U.S. Pat. Nos. 8,561,403, 8,668,614, 9,670,832 and 10,655,711 are specifically incorporated herein by reference for all that they disclose and teach. Driven turbocharger 100 comprises a turbo shaft 104 with a compressor 106 attached to one end and a turbine 108 attached to the other end. Planetary traction drive 102 interfaces with turbo shaft 104 to transmit torque to and from turbo shaft 104. Ring gear 110 acts as a low-speed output of planetary traction drive 102 and meshes with transfer gear 112. Transfer gear 112 is coupled to transmission 114 which transmits torque between driven turbocharger 100 and engine 116. Turbo shaft 104 is a sun shaft of planetary traction drive 102, and attaching turbine 108 and compressor 106 to turbo shaft 104, and coupling transmission 114 to ring gear 110 through transfer gear 112 forms driven turbocharger 100, as power transfer between engine 116 and turbine 108 and compressor 106 is enabled. During assembly, it is necessary to set a preload on planetary traction drive 102 in order provide force on each traction interface to enable planetary traction drive 102 to transmit torque properly. The present invention uses an adjustable ring shim 118 to set this preload in a way that can account for variations in manufacturing of the different parts of planetary traction drive 102.

Figure 2A:
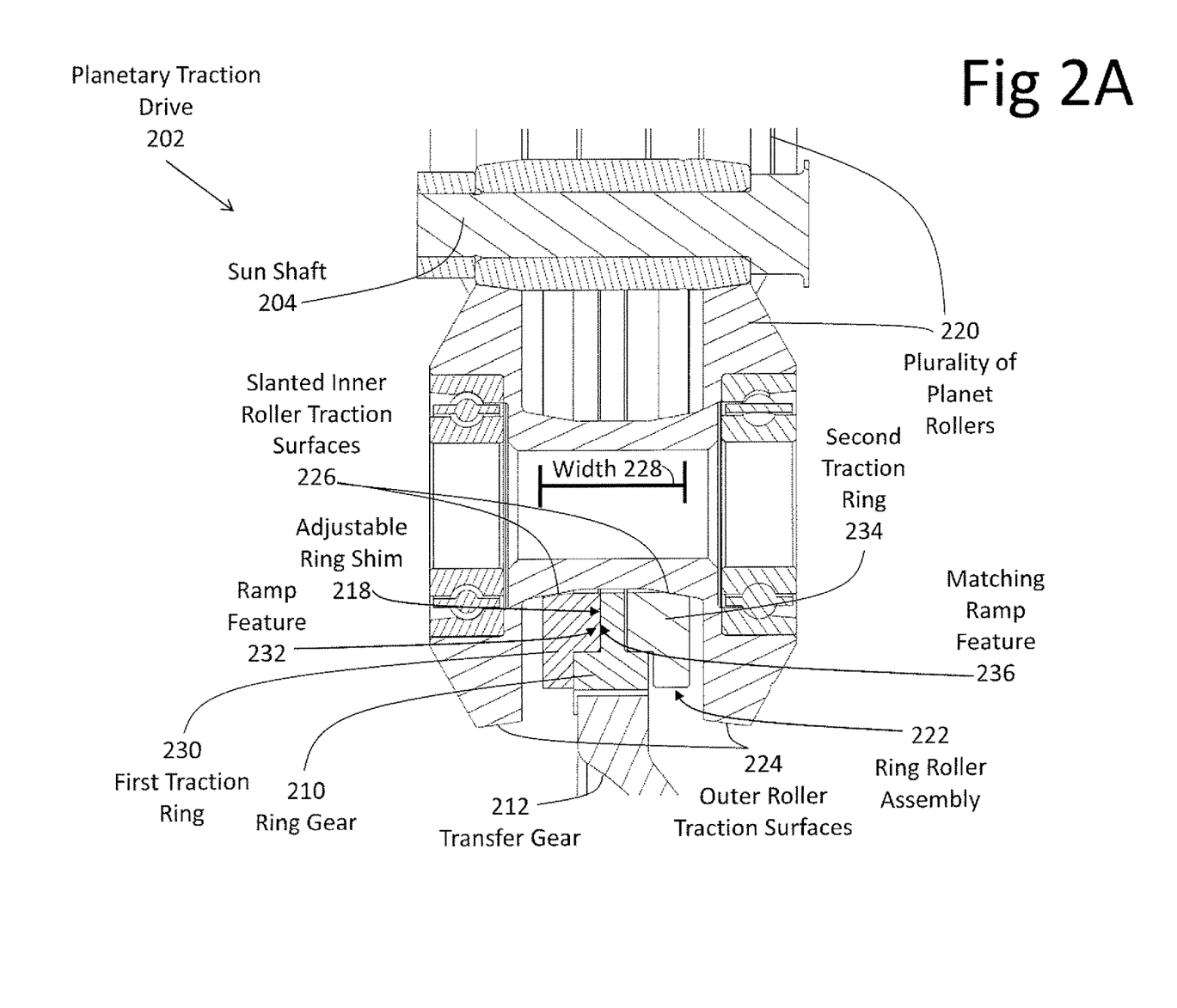
FIG. 2A is a cross section of an embodiment of a planetary traction drive with an adjustable ring shim in a narrow position.

FIG. 2A is a cross section of an embodiment of a planetary traction drive 202 with an adjustable ring shim 218 in a narrow position. Planetary traction drive 202 is comprised of a sun shaft 204, which corresponds to turbo shaft 104 of FIG. 1, a plurality of planetary rollers 220, and a ring roller assembly 222. Plurality of planetary rollers 220 have outer roller traction surfaces 224 that interface with sun shaft 204 to transfer torque to and from sun shaft 204. Ring roller assembly 222 comprises a ring gear 210 as well as a first traction ring 230 and a second traction ring 234 located concentrically with ring gear 210 that interface with slanted inner roller traction surfaces 226 of plurality of planet rollers 220. Adjustable ring shim 218 is between ring gear 210 and first traction ring 230 of ring roller assembly 222. At least one adjustable ring shim 218 is used, and a series of multiple adjustable ring shims 218 may also be used. As shown in FIG. 2A, adjustable ring shim 218 is in a narrow position, corresponding to when planetary traction drive 202 is initially assembled. In this position, a width 228 of ring roller assembly 222 is at a minimal value, and places a minimal or even zero amount of force on slanted inner roller traction surfaces 226 of plurality of planet rollers 220. Adjustable ring shim 218 is comprised of a ramp feature 232 formed on first traction ring 230 that mates with a matching ramp feature 236 on ring gear 210 such that when first traction ring 230 is rotated relative to ring gear 210 during assembly, ramp feature 232 slides on matching ramp feature 236 and moves first traction ring 230 axially away from ring gear 210. This action sets the width 228 of ring roller assembly 222 to provide a specified amount of preload force on slanted inner roller traction surfaces 226 of plurality of planet rollers 220 during assembly of planetary traction drive 202. Second traction ring 234 may be formed as part of ring gear 210, or may be a separate part that is coupled to ring gear 210. Ring gear 210 meshes with transfer gear 212 at a low speed output of planetary traction drive 202.

Figure 2B:
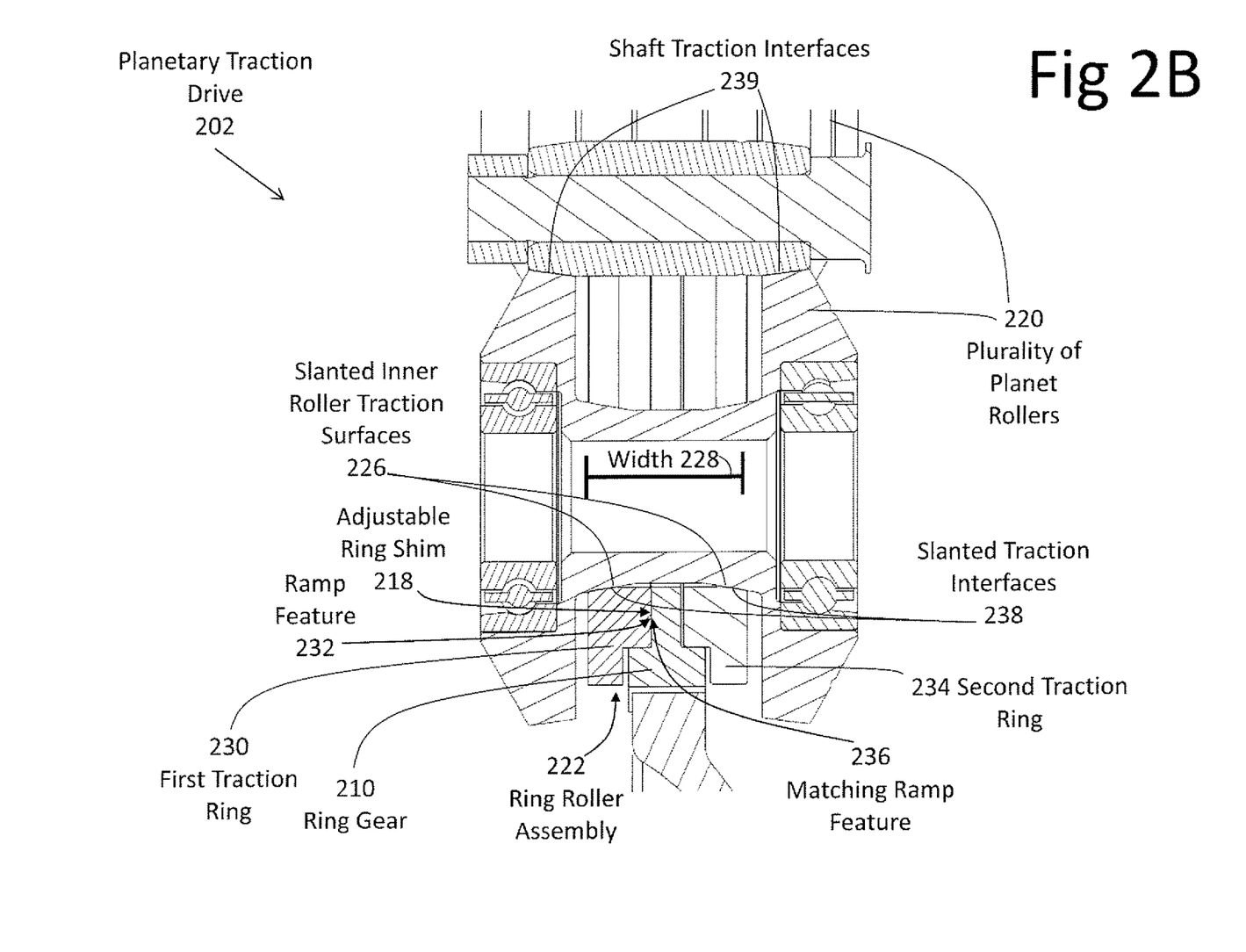
FIG. 2B is a cross section of the planetary traction drive of FIG. 2A with an adjustable ring shim in a wide position.

FIG. 2B is a cross section of the planetary traction drive 202 of FIG. 2A with an adjustable ring shim 218 in a wide position. This wide position is representative of adjustable ring shim 218 being set for a specified preload force on planetary traction drive 202 after assembly. The relative movement between first traction ring 230 and ring gear 210 is exaggerated for illustrative purposes. Accordingly, it is understood that the movement of first traction ring 230 relative to ring gear 210 may be less than that shown in FIG. 2B. Once planetary traction drive 202 is assembled, first traction ring 230 is rotated relative to ring gear 210 so that first traction ring 230 slides ramp feature 232 on matching ramp feature 236 and moves axially away from ring gear 210, increasing width 228. As width 228 increases, additional force is placed on slanted inner roller traction surfaces 226 of plurality of planet rollers 220. Adjustable ring shim 218 can vary the width 228 of ring roller assembly 222 so that a desired amount of preload force on slanted inner roller traction surfaces 226 can be achieved during assembly. Correspondingly, this sets the forces on slanted traction interfaces 238 and shaft traction interfaces 239 to a desired value for proper torque transfer through slanted traction interfaces 238 and shaft traction interfaces 239. This desired amount of preload force generated by adjustable ring shim 218 is an amount of preload force that is sufficient to load all traction interfaces in planetary traction drive 202 so that these traction interfaces transmit torque without excessive slipping, enabling operation and torque transfer through planetary traction drive 202. The necessary forces in these traction interfaces can be calculated based on the design and operating specifications of the planetary traction drive 202, and the needed preload force can then be calculated as well to specify an appropriate loading by adjustable ring shim 218. This ability of adjustable ring shim 218 to set the width 228 of ring roller assembly 222 enables simple assembly of planetary traction drive 202, while ensuring that the planetary traction drive 202 meets required specifications. Additionally, the variable width of ring roller assembly 222 created by incorporating adjustable ring sim 218 can allow for greater ease of assembly of planetary traction drive 202 by providing a narrower profile of ring roller assembly 222 during assembly. This adjustability can compensate for manufacturing variations in the various parts of planetary traction drive 202 so that custom shims are not necessary to provide a specified amount of preload force in planetary traction drive 202. It may be helpful to rotate ring roller assembly 222 during the tuning of adjustable ring shim 218, to prevent scuffing of ring roller assembly 222 on slanted inner roller traction surfaces 226.

Figure 3:
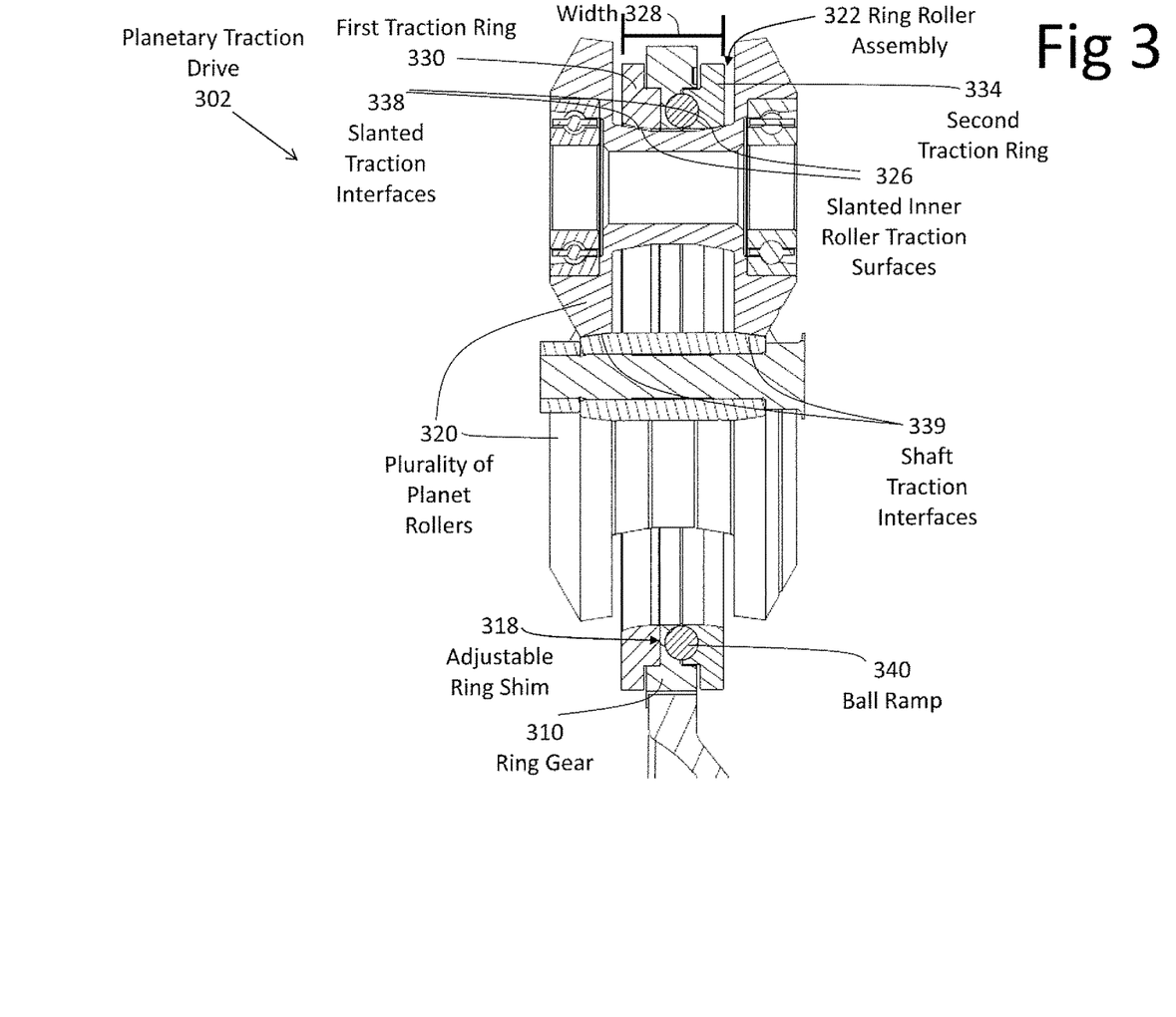
FIG. 3 is a cross section of an embodiment of a planetary traction drive with an adjustable ring shim and a ball ramp integrated into the ring roller assembly.

FIG. 3 is a cross section of an embodiment of a planetary traction drive 302 with an adjustable ring shim 318 and a ball ramp 340 integrated into the ring roller assembly 322. In this embodiment, ring gear 310 mates with second traction ring 334 through ball ramp 340. Ring gear 310 mates with first traction ring 330 through adjustable ring shim 318. Adjustable ring shim 318 and ball ramp 340 both function to vary the width 328 of ring roller assembly 322, which adjusts the forces on slanted traction interfaces 338 and shaft traction interfaces 339 of planetary traction drive 302. Adjustable ring shim 318 is used to set a preload on slanted inner roller traction surfaces 326 of plurality of planet rollers 320 during assembly of planetary traction drive 302, and ball ramp 340 dynamically varies the forces as planetary traction drive 302 operates, as taught in U.S. Pat. No. 10,655,711, issued May 19, 2020, entitled "Single Angular Contact Ball Ramp For Driven Turbocharger." Adjustable ring shim 318 is set to provide a sufficient amount of preload force for planetary traction drive 302 to operate without excessive slipping in slanted traction interfaces 338 and shaft traction interfaces 339 while at near-zero torque conditions. Assembly tolerances in planetary traction drive 302 or surface wear of slanted traction interfaces 338 or shaft traction interfaces 339 can be compensated by adjustable ring shim 318, which ensures that slanted traction interfaces 338 and shaft traction interfaces 339 do not disconnect and slip. The preload force ensures engagement of slanted traction interfaces 338. Some small amount of slip is normal during operation of the planetary traction drive 302, but the adjustable ring shim 318 prevents the slip amount from becoming too large. Generally, a normal amount of slip during operation of the planetary traction drive 302 is about 1-2%, and values of slip over 5% should be avoided. The adjustable ring shim 318 keeps the slip to the normal, low range until the ball ramp 340 actuates, then the ball ramp 340 dynamically varies the load to keep slip in the normal range. The use of first traction ring 330 with adjustable ring shim 318 and second traction ring 334 with ball ramp 340 in ring roller assembly 322 allows for both preload forces to be set in planetary traction drive 302 as well as variable dynamic forces based on torque transfer to enable proper forces on slanted traction interfaces 338 and shaft traction interfaces 339 throughout operation of planetary traction drive 302. Until ball ramp 340 actuates under torque throughput through traction drive 302, adjustable ring shim 318 generates sufficient preload forces to avoid excessive slip in slanted traction interfaces 338 and shaft traction interfaces 339.

Figure 4:
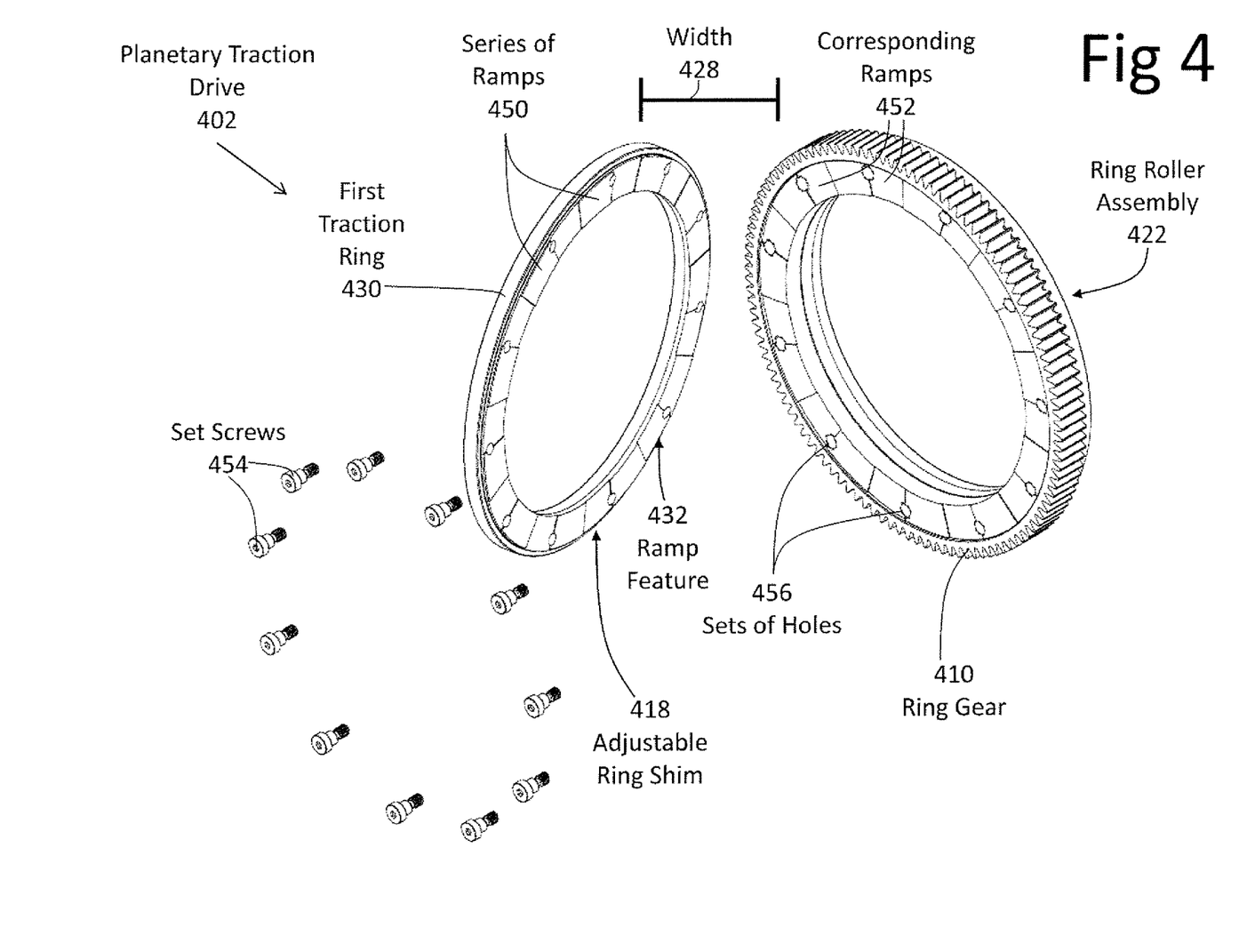
FIG. 4 is an exploded view an embodiment of a ring roller assembly for a planetary traction drive where the ramp feature of the adjustable ring shim is comprised of a series of ramps formed on the first traction ring.

FIG. 4 is an exploded view an embodiment of a ring roller assembly 422 for a planetary traction drive 402 where the ramp feature 432 of the adjustable ring shim 418 is comprised of a series of ramps 450 formed on the first traction ring 430. First traction ring 430 is rotated in the view to better show features on first traction ring 430. First traction ring 430 is made with a series of ramps 450 formed on it that mate with corresponding ramps 452 formed on ring gear 410. These series of ramps 450 are formed around the full circumference of first traction ring 430, in order to provide even spacing of width 428 around ring roller assembly 422. During assembly of planetary traction drive 402, as first traction ring 430 is rotated relative to ring gear 410, the series of ramps 450 slide on the corresponding ramps 452 to move first traction ring 430 axially away from ring gear 410 to set a width 428 of ring roller assembly 422 that provides a specified preload in planetary traction drive 402. Also shown are set screws 454 that function to hold adjustable ring shim 418 in place once width 428 has been set. Set screws 454 in first traction ring 430 press against ring gear 410 to hold adjustable ring shim 418 in place. Further, as shown in this embodiment, sets of holes 456 may be machined into ring gear 410, so that set screws 454 thread into sets of holes 456 in ring gear 410 to provide positive engagement of set screws 454 to hold adjustable ring shim 418 in place. Sets of holes 456 in ring gear 410 are provided at discrete intervals, so that certain subsets of sets of holes 456 may be utilized by set screws 454 to provide discrete levels of width 428 of ring roller assembly 422 by adjustable ring shim 418. In this way, adjustable ring shim 418 has certain discrete levels that may be selected, and set screws 454 threaded into sets of holes 456 provide positive engagement to hold first traction ring 430 in place against ring gear 410.

Figure 5:
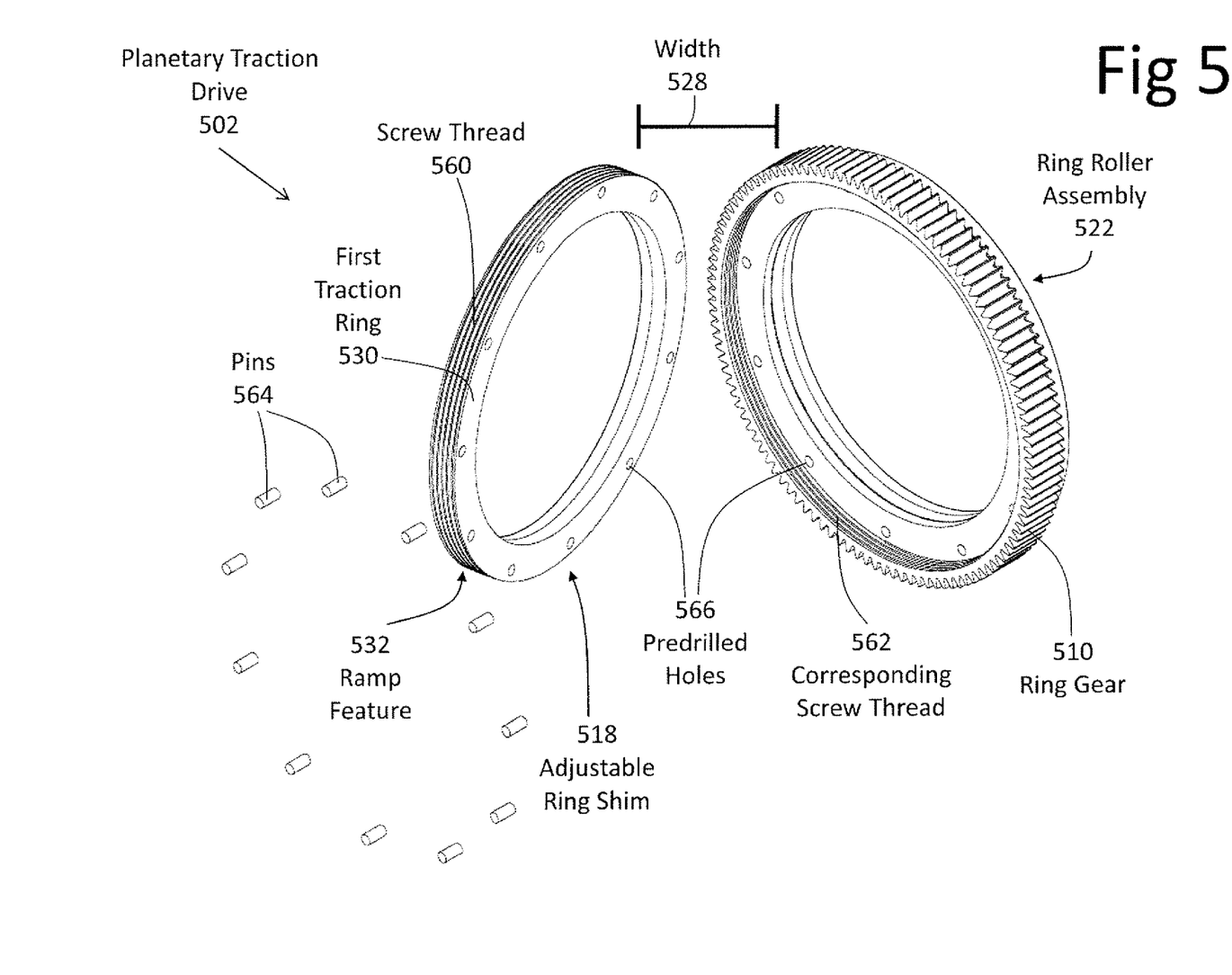
FIG. 5 is an exploded view an embodiment of a ring roller assembly for a planetary traction drive where the ramp feature of the adjustable ring shim is comprised of a screw thread formed on the first traction ring.

FIG. 5 is an exploded view an embodiment of a ring roller assembly 522 for a planetary traction drive 502 where the ramp feature 532 of the adjustable ring shim 518 is comprised of a screw thread 560 formed on the first traction ring 530. First traction ring 530 is rotated in the view to better show features on first traction ring 530. First traction ring 530 has a screw thread 560 formed on it that mates with a corresponding screw thread 562 formed on ring gear 510. Effectively, this allows first traction ring 530 to screw in and out of ring gear 510 to vary the width 528 of ring roller assembly 522. This axial adjustment ability of adjustable ring shim 518 provided by screw thread 560 and corresponding screw thread 562 allows a prescribed preload to be set in planetary traction drive 502 during assembly. Also shown are pins 564 that are set through first traction ring 530 and ring gear 510. Predrilled holes 566 in both ring gear 510 and first traction ring 530 allow pins 564 to be inserted once the prescribed preload has been obtained. In this way, adjustable ring shim 518 is held in place by pins 564 set through first traction ring 530 and ring gear 510. Providing a variety of predrilled holes 566 in ring gear 510 allows for many different possibilities of where pins 564 can be inserted, to allow for a variety of available settings of width 528 of ring roller assembly 522 to meet the required preload in planetary traction drive 502. Either pins 564 or set screws 454 from FIG. 4 may be used in any configuration of the invention.

Figure 6:
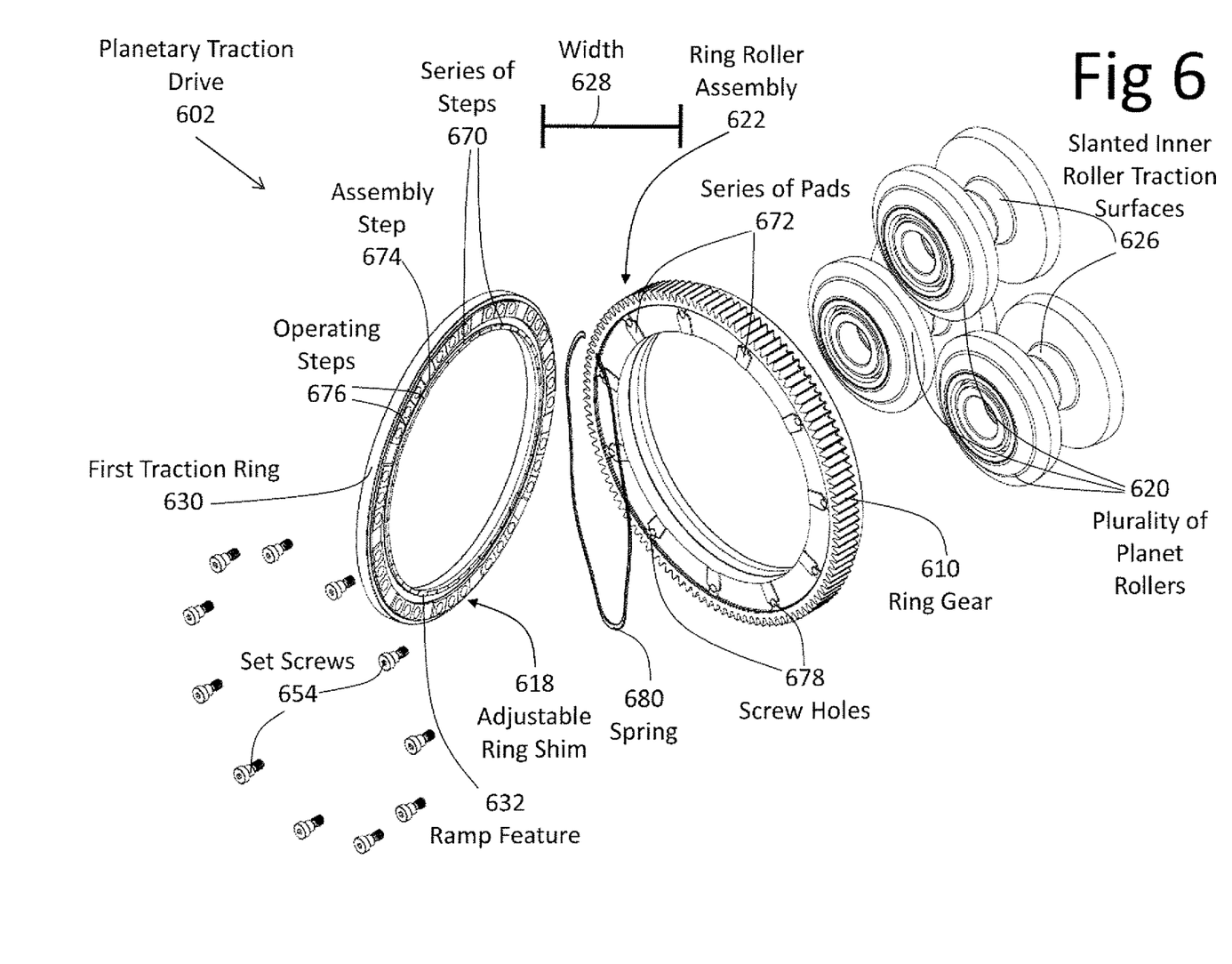
FIG. 6 is an exploded view of an embodiment of a planetary traction drive where the ramp feature of the adjustable ring shim is comprised of a series of steps formed on the first traction ring.

FIG. 6 is an exploded view of an embodiment of a planetary traction drive 602 where the ramp feature 632 of the adjustable ring shim 618 is comprised of a series of steps 670 formed on the first traction ring 630. First traction ring 630 is rotated in the view to better show features on first traction ring 630. First traction ring 630 is made with a series of steps 670 formed on it that mate with a series of pads 672 formed on ring gear 610. These series of steps 670 are formed around the full circumference of first traction ring 630, in order to provide even spacing of width 628 around ring roller assembly 622. Each series of steps 670 contains an assembly step 674, which corresponds to the minimum width 628 positioning of first traction ring 630 of FIG. 2A. Each series of steps 670 also has operating steps 676 that progressively set higher discrete widths 628 of ring roller assembly 622. During assembly of planetary traction drive 602, as first traction ring 630 is rotated relative to ring gear 610, the series of steps 670 slide on series of pads 672 on ring gear 610 to move first traction ring 630 axially away from ring gear 610 to set a width 628 of ring roller assembly 622 that provides a specified preload in planetary traction drive 602. Initially, assembly step 674 of each of series of steps 670 mates with each of series of pads 672 at a minimum of width 628. As first traction ring 630 is rotated, the operating steps 676 of series of steps 670 sequentially slide on series of pads 672 to provide increasing discrete widths 628 of ring roller assembly 622. Further, screw holes 678 can be machined into series of pads 672 that accept set screws 654 that fasten through first traction ring 630 into ring gear 610. Set screws 654 provide positive engagement of first traction ring 630 to ring gear 610 to fix the position of adjustable ring shim 618 after assembly. The series of steps 670 formed on first traction ring 630 provide various levels of shimming available to adjustable ring shim 618 to provide a specified preload in planetary traction drive 602.

Also shown in FIG. 6 is an optional spring 680 that is located between first traction ring 630 and ring gear 610. Placing spring 680 between first traction ring 630 and ring gear 610 provides a secondary method to provide clamping forces in planetary traction drive 602. As various parts in planetary traction drive 602 wear, spring 680 maintains forces on slanted inner roller traction surfaces 626 of plurality of planet rollers 620, so that the clamping forces in planetary traction drive 602 are not reduced or compromised. Ramp feature 632 of adjustable ring shim 618 sets an initial clamping force on planetary traction drive 602, and spring 680 maintains this clamping force during long term operation of planetary traction drive 602.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A planetary traction drive comprising:
   a sun shaft;
   a plurality of planet rollers with outer roller traction surfaces that interface with said sun shaft;
   a ring roller assembly comprising:
   a ring gear;
   a first traction ring and a second traction ring located concentrically with said ring gear that interface with slanted inner roller traction surfaces of said plurality of planet rollers;
   at least one adjustable ring shim between said ring gear and said first traction ring that sets a width of said ring roller assembly to provide a preload force on said slanted inner roller traction surfaces of said plurality of planet rollers during assembly of said planetary traction drive, where said adjustable ring shim comprises:

a ramp feature on said first traction ring that mates with a matching ramp feature on said ring gear such that when said first traction ring is rotated relative to said ring gear during assembly said ramp feature slides on said matching ramp feature and moves said first traction ring axially away from said ring gear to set said width of said ring roller assembly.

2. The planetary traction drive of claim 1 where said ramp feature comprises a series of ramps formed on said first traction ring.

3. The planetary traction drive of claim 1 where said ramp feature comprises a screw thread formed on said first traction ring.

4. The planetary traction drive of claim 1 where said ramp feature comprises a series of steps formed on said first traction ring.

5. The planetary traction drive of claim 1 where said adjustable ring shim is held in place by set screws in said first traction ring that press against said ring gear.

6. The planetary traction drive of claim 1 where said adjustable ring shim is held in place by set screws in said first traction ring that thread into sets of holes in said ring gear.

7. The planetary traction drive of claim 1 where said adjustable ring shim is held in place by pins set through said first traction ring and said ring gear.

8. The planetary traction drive of claim 1 where said ring gear mates with said second traction ring through a ball ramp.

9. The planetary traction drive of claim 1 further comprising:
a spring located between said first traction ring and said ring gear to maintain forces on said slanted inner roller traction surfaces of said plurality of planet rollers.

10. The planetary traction drive of claim 1 further comprising:
a turbine and a compressor attached to said sun shaft and a transmission coupled to said ring gear to form a driven turbocharger.

11. A method of setting a preload in a planetary traction drive comprising:
interfacing outer roller traction surfaces of a plurality of planet rollers with a sun shaft;
assembling a ring roller assembly comprising a ring gear, a first traction ring, and a second traction ring;
interfacing said first traction ring and said second traction ring with slanted inner roller traction surfaces of said plurality of planet rollers;
forming a ramp feature on said first traction ring that mates with a matching ramp feature on said ring gear to produce an adjustable ring shim;
rotating said first traction ring relative to said ring gear to slide said ramp feature on said matching ramp feature which moves said first traction ring axially away from said ring gear and sets a width of said ring roller assembly to place a preload force on said slanted inner roller traction surfaces of said plurality of planet rollers during assembly of said planetary traction drive.

12. The method of claim 11 where said ramp feature comprises a series of ramps formed on said first traction ring.

13. The method of claim 11 where said ramp feature comprises a screw thread formed on said first traction ring.

14. The method of claim 11 where said ramp feature comprises a series of steps formed on said first traction ring.

15. The method of claim 11 where said adjustable ring shim is held in place by set screws in said first traction ring that press against said ring gear.

16. The method of claim 11 where said adjustable ring shim is held in place by set screws in said first traction ring that thread into sets of holes in said ring gear.

17. The method of claim 11 where said adjustable ring shim is held in place by pins set through said first traction ring and said ring gear.

18. The method of claim 11 where said ring gear mates with said second traction ring through a ball ramp.

19. The method of claim 11 further comprising:
placing a spring between said first traction ring and said ring gear to maintain forces on said slanted inner roller traction surfaces of said plurality of planet rollers.

20. The method of claim 11 further comprising:
attaching a turbine and a compressor to said sun shaft and coupling a transmission to said ring gear to form a driven turbocharger.

* * * * *